(12) United States Patent
Nakamura et al.

(10) Patent No.: US 7,123,909 B2
(45) Date of Patent: Oct. 17, 2006

(54) SUBSCRIBER PROFILE CHANGING METHOD, SUBSCRIBER PROFILE FILE UPDATING METHOD, MOBILE COMMUNICATION SYSTEM, EXCHANGE, AND HOME MEMORY STATION

(75) Inventors: Kaori Nakamura, Yokohama (JP); Kazuyuki Kozu, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 601 days.

(21) Appl. No.: 10/054,735

(22) Filed: Nov. 13, 2001

(65) Prior Publication Data
US 2002/0128011 A1    Sep. 12, 2002

(30) Foreign Application Priority Data
Nov. 14, 2000    (JP)    ............................. 2000-347125

(51) Int. Cl.
*H04Q 7/20*    (2006.01)
(52) U.S. Cl. ................... 455/432.3; 455/432.1; 455/433; 455/435.1
(58) Field of Classification Search ............. 455/432.1, 455/432.3, 433, 435.1, 436, 435.2, 435.3, 455/437, 438
See application file for complete search history.

(56) References Cited

U.S. PATENT DOCUMENTS

| | | | |
|---|---|---|---|
| 5,590,175 A | | 12/1996 | Gallant et al. |
| 5,850,603 A | | 12/1998 | Lantto et al. |
| 5,953,406 A | * | 9/1999 | LaRue et al. .......... 379/265.01 |
| 6,134,446 A | * | 10/2000 | Sasuta et al. ............ 455/456.5 |
| 6,408,181 B1 | * | 6/2002 | Ho et al. .................. 455/432.1 |
| 6,449,479 B1 | * | 9/2002 | Sanchez ..................... 455/433 |
| 6,594,490 B1 | * | 7/2003 | Toyoda et al. .............. 455/433 |

FOREIGN PATENT DOCUMENTS

| | | |
|---|---|---|
| JP | 10-042350 | 2/1998 |
| JP | 2000-261849 | 9/2000 |
| WO | WO 98/23099 | 5/1998 |
| WO | WO 98/28930 | 7/1998 |

OTHER PUBLICATIONS

EPO Office Action for App. No. 01309587, Mar. 19, 2002.
Official Notice of Rejection; Case No.: DCMH120305, Patent Application No.: 2000-347125.

* cited by examiner

*Primary Examiner*—Joseph Feild
*Assistant Examiner*—Huy D Nguyen
(74) *Attorney, Agent, or Firm*—Workman Nydegger

(57) ABSTRACT

A subscriber profile changing method etc. is provided. While a mobile terminal 110 is present in a service area of an exchange 131, a subscriber profile is changed only in the exchange 131. When the mobile station 110 moves to a service area of an exchange 132, a home memory station 120 requests the exchange 131 to delete the subscriber profile of the mobile terminal 110. Before deleting the subscriber profile, the exchange 131 checks a flag to see whether or not the subscriber profile was changed while the mobile terminal 110 was present in the service area of the exchange 131. If the subscriber profile has been changed, the exchange 131 sets the changed subscriber profile in a deletion request response signal and transmits this signal to the home memory station 120.

7 Claims, 10 Drawing Sheets

SUBSCRIBER PROFILE CHANGING METHOD, SUBSCRIBER PROFILE FILE UPDATING METHOD, MOBILE COMMUNICATION SYSTEM, EXCHANGE, AND HOME MEMORY STATION

This application claims priority under 35 U.S.C. 119 to Patent Application No. 2000-347125 filed Nov. 14, 2000 in Japan, the content of which is incorporated hereinto by reference.

BACKGROUND OF THE INVENTION

1. Field of the Invention

The present invention relates to a subscriber profile changing method, a subscriber profile file updating method, a mobile communication system, an Exchange, and a home memory station.

2. Description of the Related Art

FIG. 1 is a diagram illustrating a communication method of downloading a subscriber profile into an exchange the service area of which contains the mobile terminal. In the example in FIG. 1, when a mobile terminal 10 becomes present in the service area of an exchange 31, it registers its location via the exchange 31. In this case, the exchange 31 downloads the subscriber profile of the mobile terminal 10 from a home memory station 20 in order to obtain information on the mobile terminal 10. The subscriber profile may be personal information, locational information, service information, or the like.

FIGS. 2 and 3 are diagrams illustrating an example of a process of changing a subscriber profile in prior art. When the mobile terminal 10 transmits a request to change its subscriber profile to the exchange 31 (FIG. 2(a)), the exchange 31 transmits the change request to the home memory station 20 (FIG. 2 and FIG. 3(b)). Upon receiving the change request, the home memory station 20 change the subscriber profile of the mobile terminal 10 on the basis of the request ((c)). Then, the home memory station 20 transmits a change request response to the exchange 31((d)). The exchange 31 transmits the received change request response to the mobile terminal 10((e)). Also, the home memory station 20 transmits the changed subscriber profile to the exchange 31((f)). The exchange 31 changes (updates) a subscriber profile of the mobile terminal 10 retained thereby to the received one ((g)). After the change, the exchange 31 responds to the home memory station 20 by notifying it that the change process has been completed at the exchange (the exchange 31) whose service area has the mobile station 10((h)).

With this method, the subscriber profile in the home memory station 20 is changed and then the subscriber profile in the exchange 31 is changed, so that two round trips of inter-station signals are required between the home memory station 20 and the exchange 30.

This process is used partly because if the mobile terminal 10 moves to the service area of a new exchange, the home memory station 20 must transmit its subscriber profile to this new exchange, that is, the home memory station 20 must have the latest information.

FIGS. 4 and 5 show an example of a process executed in prior art if the change of the location registration is requested after the mobile terminal has moved to the service area of a different exchange. It is assumed that the mobile terminal 10, which shifts from the service area of the exchange 31 to the service area of an exchange 32, transmits a location registration change request to the exchange 32, which is the new exchange whose service area has the mobile terminal 10. The exchange 32 transmits this location registration request to the home memory station 20 (FIGS. 4 and 5(a)). Upon receiving the request, the home memory station 20 transmits a subscriber profile deletion request to the exchange 31, which is the old exchange whose service area had the mobile terminal 10((b)). Upon receiving the deletion request, the exchange 31 deletes its subscriber profile ((c)), and transmits a deletion completion response to the home memory station 20((d)). Upon receiving this response, the home memory station 20 changes its subscriber profile on the basis of the location registration request ((e)), and inputs the changed subscriber profile to the exchange 32((f)). Subsequently, a change process completion response is transmitted between the exchange 32 and the home memory station 20((g) and (h)).

Thus, in the prior art, when the subscriber profile is to be changed, a large number of signals are transmitted and received between the home memory station and the exchange.

SUMMARY OF THE INVENTION

It is an object of the present invention to reduce the number of signals transmitted and received between the home memory station and the exchange when the subscriber profile is to be changed.

To accomplish the above mentioned object, in the first aspect of the present invention, there is provided a subscriber profile changing method of changing at an exchange a subscriber profile of a mobile terminal present in a service area of the exchange, the method comprising the steps of: receiving from the mobile terminal, a request to change the subscriber profile; changing the subscriber profile on the basis of the change request and retaining the changed subscriber profile; and retaining information indicating that the subscriber profile has been changed.

In the second aspect of the present invention, there is provided a subscriber profile updating method of updating a subscriber profile of a mobile terminal in a mobile communication system comprising exchanges and a home memory station, when the mobile terminal, which is present in a service area of a first exchange, moves to a service area of a second exchange, the method comprising the steps of: if the subscriber profile as retained by the first exchange is changed while the mobile terminal is present in the service area of the first exchange, transmitting the subscriber profile from the first exchange to the home memory station; and updating, at the home memory station, the subscriber profile as retained thereby to the subscriber profile as received thereby; deleting, at the first exchange, the subscriber profile as retained thereby; transmitting the subscriber profile from the home memory station to the second exchange; and retaining, at the second exchange, the subscriber profile as received thereby.

In the third aspect of the present invention, there is provided a subscriber profile updating method of updating a subscriber profile of a mobile terminal in a mobile communication system comprising an exchange and a home memory station, the method comprising the steps of: if the subscriber profile as retained by the exchange is changed while the mobile terminal is present in a service area of the exchange, transmitting the subscriber profile from the exchange to the home memory station; and updating, at the home memory station, the subscriber profile as retained thereby to the subscriber profile as received thereby; and deleting, at the exchange, the subscriber profile as retained thereby.

In the fourth aspect of the present invention, there is provided an exchange comprising: means for receiving from a mobile terminal present in a service area of the exchange, a request to change a subscriber profile of the mobile terminal; means for changing the subscriber profile on the basis of the change request and retaining the changed subscriber profile; and means for retaining information indicating that the subscriber profile has been changed.

In the fifth aspect of the present invention, there is provided a mobile communication system comprising exchanges and a home memory station, one of the exchanges comprising: means for transmitting a subscriber profile of a mobile terminal to the home memory station if the mobile terminal, which is present in a service area of the one of the exchanges, moves to a service area of another exchange and if the subscriber profile of the mobile terminal as retained by the one of the exchanges is changed while the mobile terminal is present in the service area of the one of the exchanges; means for deleting the subscriber profile of the mobile terminal as retained by the one of the exchanges if the mobile terminal, which is present in the service area of the one of the exchanges, moves to a service area of another exchange; means for receiving the subscriber profile of the mobile terminal from the home memory station if the mobile terminal, which is present in a service area of another exchange, moves to the service area of the one of the exchanges; and means for retaining the subscriber profile of the mobile terminal as received by the one of the exchange if the mobile terminal, which is present in a service area of another exchange, moves to the service area of the one of the exchanges, and the home memory station comprising: means for receiving the subscriber profile of the mobile terminal from a first exchange if the mobile terminal, which is present in a service area of the first exchange, moves to a service area of a second exchange and if the subscriber profile of the mobile terminal as retained by the first exchange is changed while the mobile terminal is present in the service area of the first exchange; means for updating the subscriber profile as retained by the home memory station to the subscriber profile as received by the home memory station if the mobile terminal, which is present in the service area of the first exchange, moves to the service area of the second exchange and if the subscriber profile of the mobile terminal as retained by the first exchange is changed while the mobile terminal is present in the service area of the first exchange; and means for transmitting the subscriber profile of the mobile terminal to the second exchange if the mobile terminal, which is present in the service area of the first exchange, moves to the service area of the second exchange.

In the sixth aspect of the present invention, there is provided an exchange for use in a mobile communication system comprising the exchange and a home memory station, the exchange comprising: means for transmitting a subscriber profile of a mobile terminal to the home memory station if the mobile terminal, which is present in a service area of the exchange, moves to a service area of another exchange and if the subscriber profile of the mobile terminal as retained by the exchange is changed while the mobile terminal is present in the service area of the exchange; means for deleting the subscriber profile of the mobile terminal as retained by the exchange if the mobile terminal, which is present in the service area of the exchange, moves to a service area of another exchange; means for receiving the subscriber profile of the mobile terminal from the home memory station if the mobile terminal, which is present in a service area of another exchange, moves to the service area of the exchange; and means for retaining the subscriber profile of the mobile terminal as received by the exchange if the mobile terminal, which is present in a service area of another exchange, moves to the service area of the exchange.

In the seventh aspect of the present invention, there is provided a home memory station for use in a mobile communication system comprising exchanges and the home memory station, the home memory station comprising: means for receiving a subscriber profile of a mobile terminal from a first exchange if the mobile terminal, which is present in a service area of the first exchange, moves to a service area of a second exchange and if the subscriber profile of the mobile terminal as retained by the first exchange is changed while the mobile terminal is present in the service area of the first exchange; means for updating the subscriber profile as retained by the home memory station to the subscriber profile as received by the home memory station if the mobile terminal, which is present in the service area of the first exchange, moves to the service area of the second exchange and if the subscriber profile of the mobile terminal as retained by the first exchange is changed while the mobile terminal is present in the service area of the first exchange; and means for transmitting the subscriber profile of the mobile terminal to the second exchange if the mobile terminal, which is present in the service area of the first exchange, moves to the service area of the second exchange.

In the eighth aspect of the present invention, there is provided a mobile communication system comprising an exchange and a home memory station, the exchange comprising: means for transmitting a subscriber profile of a mobile terminal to the home memory station if the subscriber profile of the mobile terminal as retained by the exchange is changed while the mobile terminal is present in the service area of the exchange; and means for deleting the subscriber profile of the mobile terminal as retained by the exchange, and the home memory station comprising: means for receiving the subscriber profile of the mobile terminal from the exchange if the subscriber profile of the mobile terminal as retained by the exchange is changed while the mobile terminal is present in the service area of the exchange; and means for updating the subscriber profile as retained by the home memory station to the subscriber profile as received by the home memory station if the subscriber profile of the mobile terminal as retained by the exchange is changed while the mobile terminal is present in the service area of the exchange.

In the ninth aspect of the present invention, there is provided a exchange for use in a mobile communication system comprising the exchange and a home memory station, the exchange comprising: means for transmitting a subscriber profile of a mobile terminal to the home memory station if the subscriber profile of the mobile terminal as retained by the exchange is changed while the mobile terminal is present in the service area of the exchange; and means for deleting the subscriber profile of the mobile terminal as retained by the exchange.

In the tenth aspect of the present invention, there is provided a home memory station for use in a mobile communication system comprising an exchange and the home memory station, the home memory station comprising: means for receiving a subscriber profile of a mobile terminal from the exchange if the subscriber profile of the mobile terminal as retained by the exchange is changed while the mobile terminal is present in the service area of the exchange; and means for updating the subscriber profile as retained by the home memory station to the subscriber profile as received by the home memory station if the subscriber profile of the mobile terminal as retained by the exchange is changed while the mobile terminal is present in the service area of the exchange.

The above configuration can reduce the number of signals transmitted and received between the home memory station and the exchange when the subscriber profile is to be changed.

The above and other objects, effects, features and advantages of the present invention will become more apparent from the following description of embodiments thereof taken in conjunction with the accompanying drawings.

BRIEF DESCRIPTION OF THE DRAWINGS

FIG. 9 is a diagram showing an example of a process executed to delete the subscriber profile from the exchange in response to activation by a maintainer or the like; and FIG. 10 is a diagram showing an example of a process executed to delete the subscriber profile from the exchange in response to activation by the maintainer or the like.

DETAILED DESCRIPTION OF PREFERRED EMBODIMENTS

An embodiment of the present invention will be described below in detail with reference to the drawings.

Figure 1:
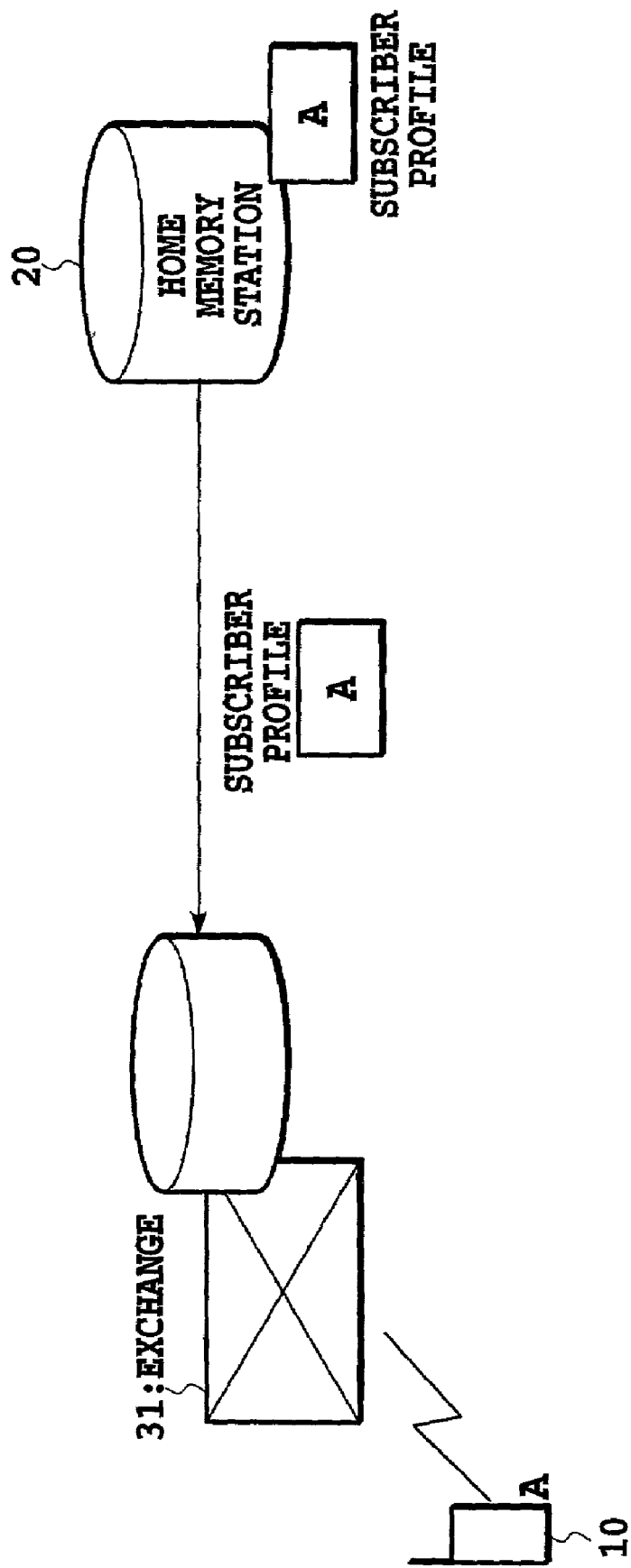
FIG. 1 is a diagram illustrating a communication method of downloading a subscriber profile into an exchange the service area of which contains the mobile terminal.
Figure 2:
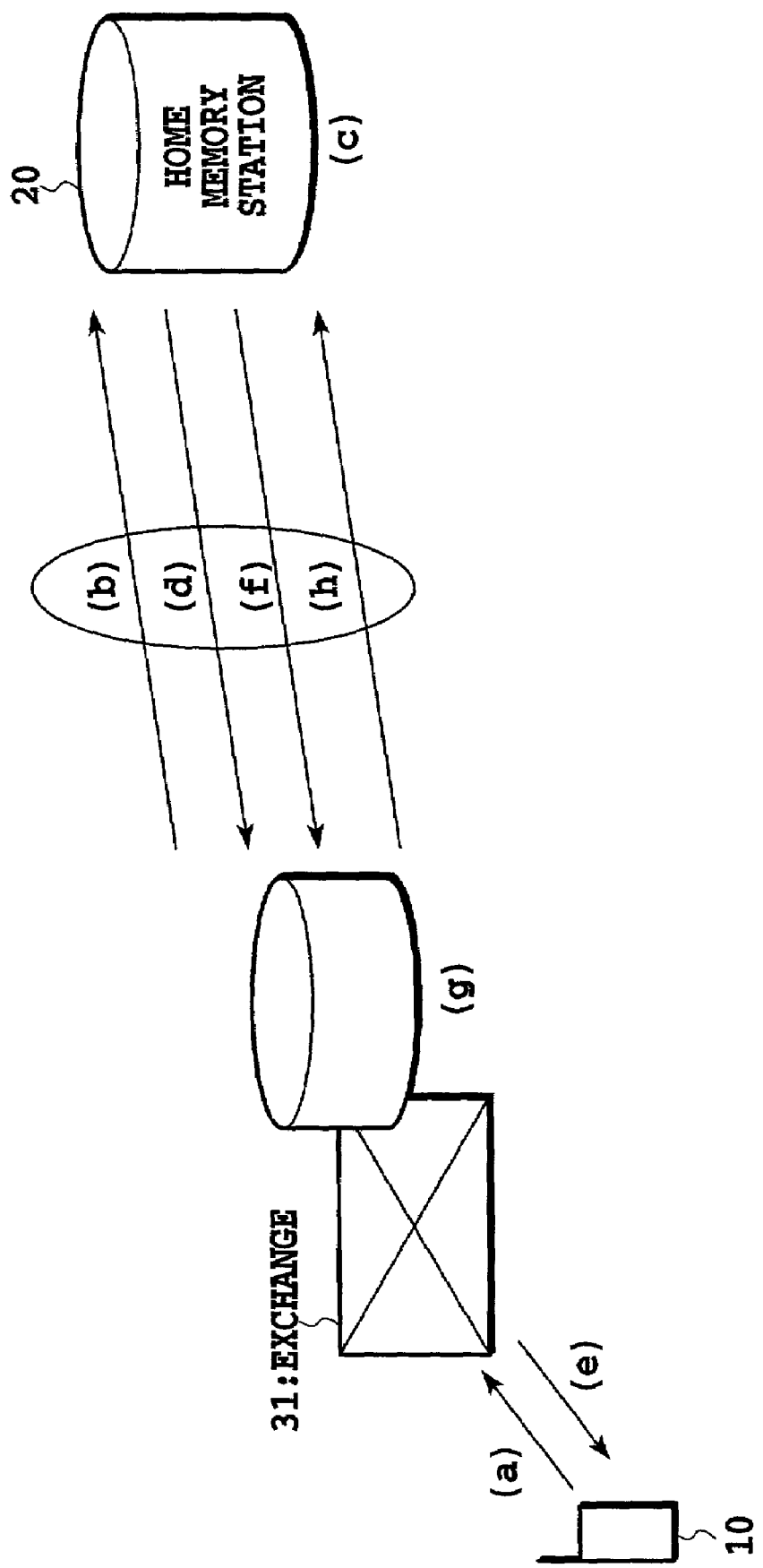
FIG. 2 is a diagram illustrating an example of a process of changing a subscriber profile in prior art.
Figure 3:
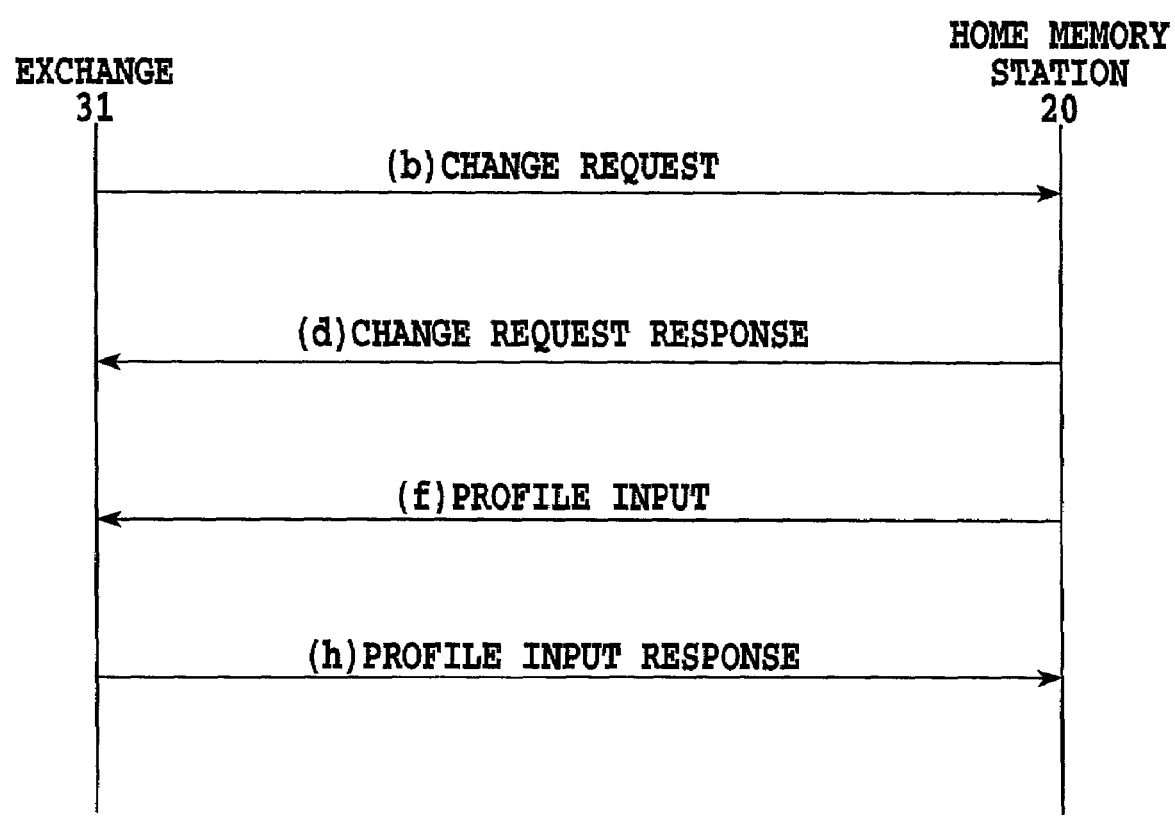
FIG. 3 is a diagram illustrating an example of a process of changing a subscriber profile in prior art.
Figure 4:
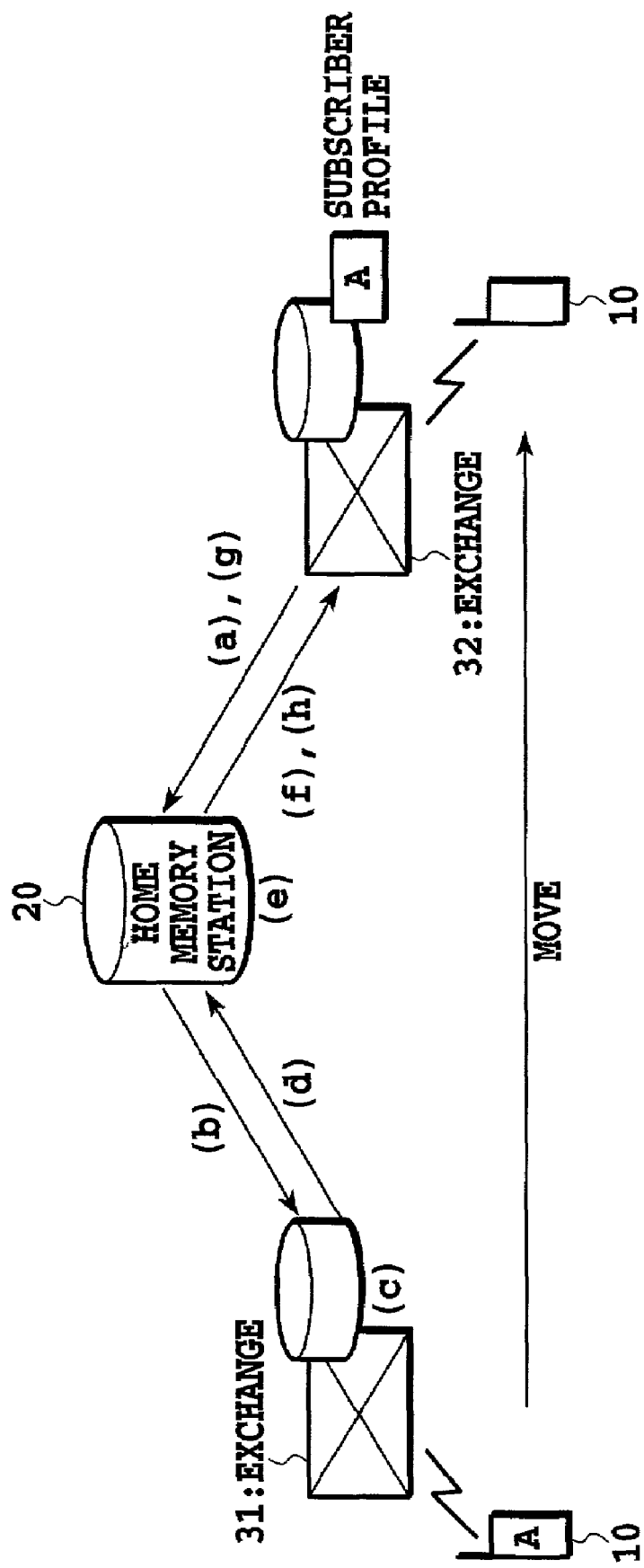
FIG. 4 is a diagram showing an example of a process executed in prior art if the change of a location registration is requested after a mobile terminal has moved to the service area of a different exchange.
Figure 5:
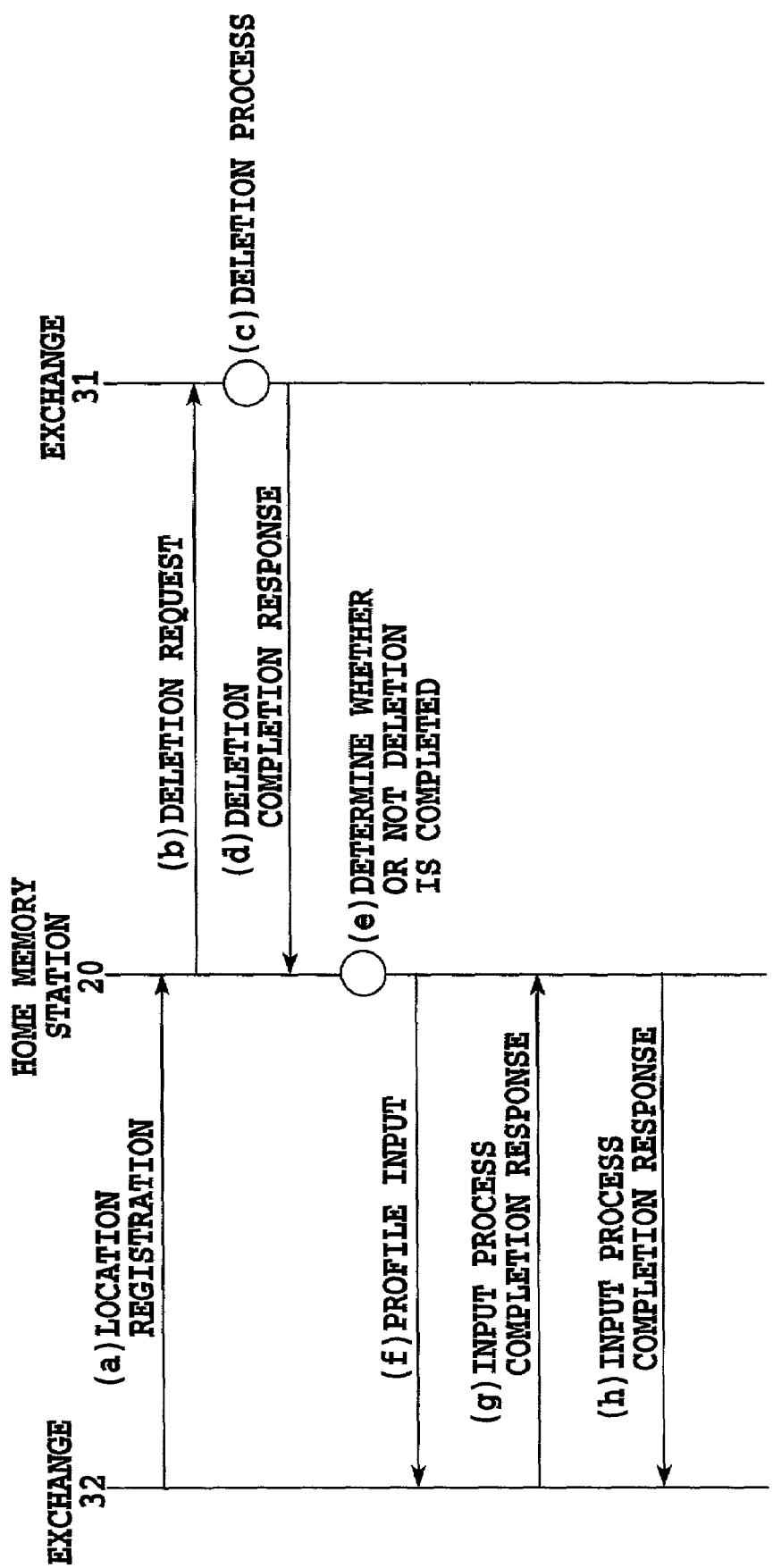
FIG. 5 is a diagram showing an example of a process executed in prior art if the change of the location registration is requested after the mobile terminal has moved to the service area of a different exchange.
Figure 6:
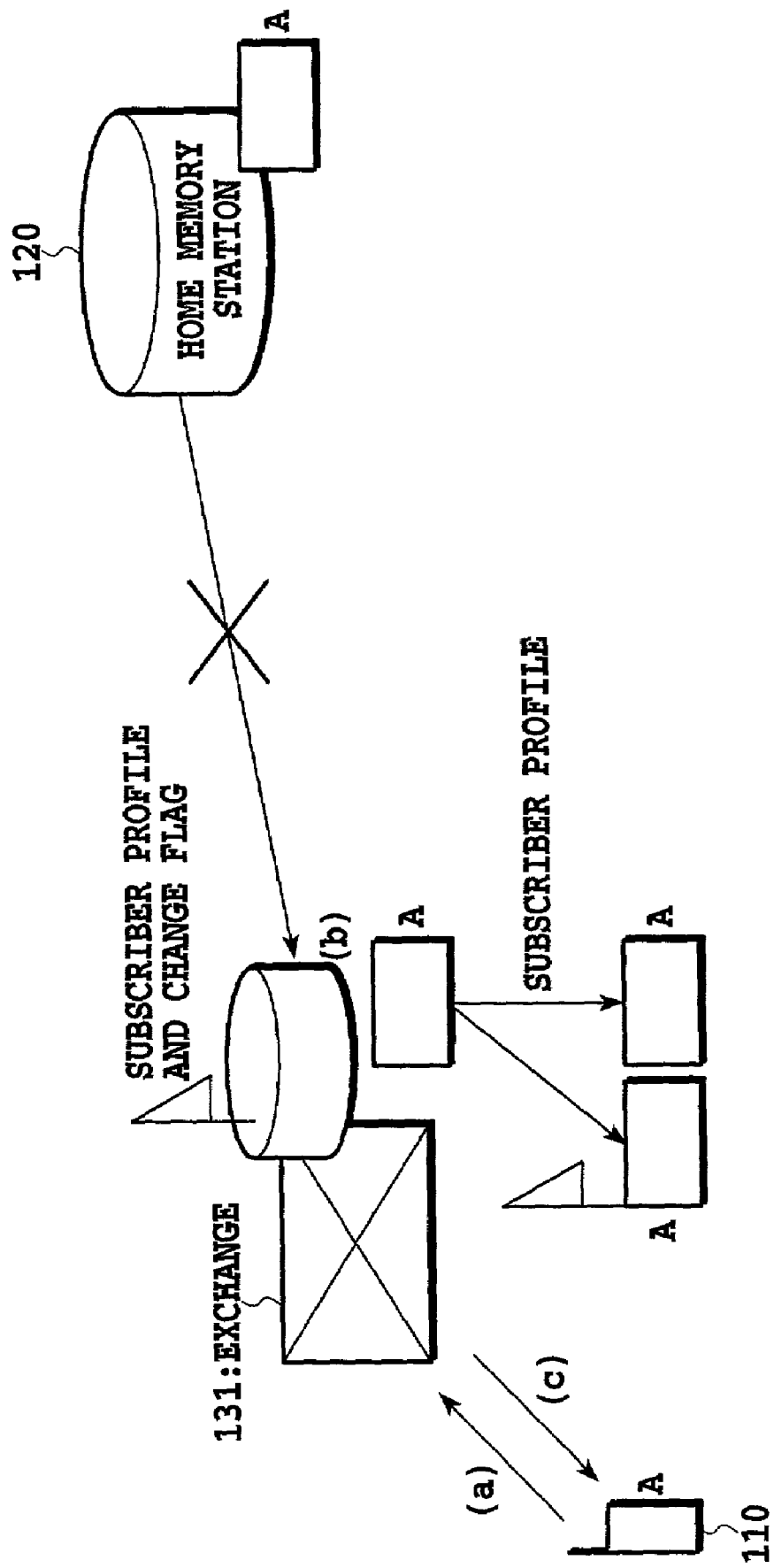
FIG. 6 is a diagram illustrating an example of a process of changing a subscriber profile according to an embodiment of the present invention.

FIG. 6 is a diagram illustrating an example of a process of changing a subscriber profile according to an embodiment of the present invention. When a mobile terminal 110 transmits a request to change its subscriber profile to an exchange 131 (FIG. 6(a)), the exchange 131 changes the subscriber profile of the mobile terminal 110 on the basis of this change request and then retains the changed profile ((b)). Furthermore, the exchange 131 sets a flag (indication) representing that the subscriber profile has been changed. That is, for example, the flag is initialized to zero and is set to one if the subscriber profile is changed. This flag indicates whether or not the subscriber profile was changed while the mobile terminal 110 was present in the service area of the exchange 131. After changing the subscriber profile, the exchange 131 transmits a change process completion response to the mobile terminal 110((c)).

With this method, as long as the mobile terminal remains in the service area of the same exchange, no transmissions are executed between a home memory station and the exchange even if the subscriber profile is changed.

Figure 7:
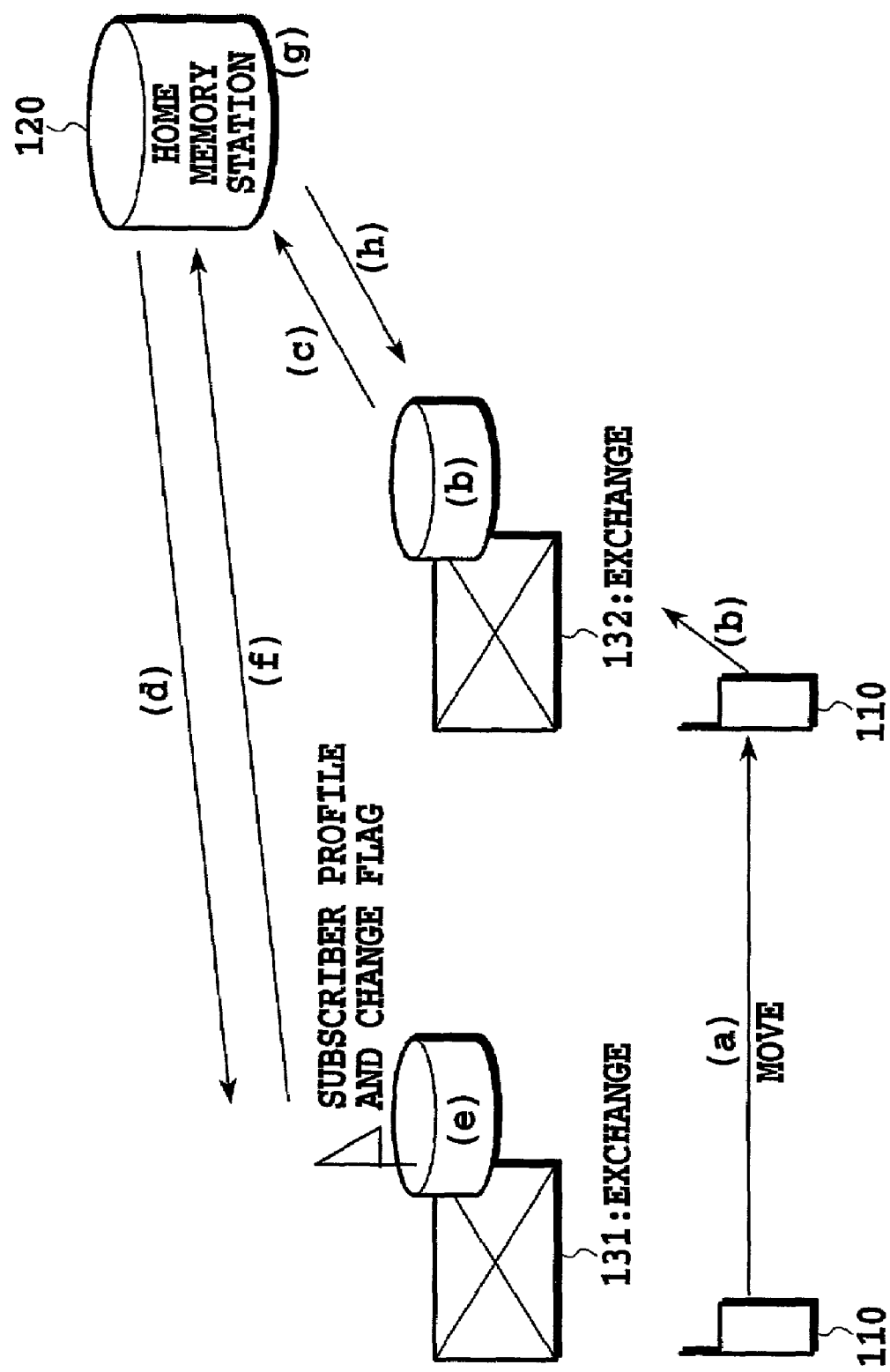
FIG. 7 is a diagram showing an example of a process executed according to the embodiment of the present invention if the mobile terminal has moved to the service area of a different exchange.
Figure 8:
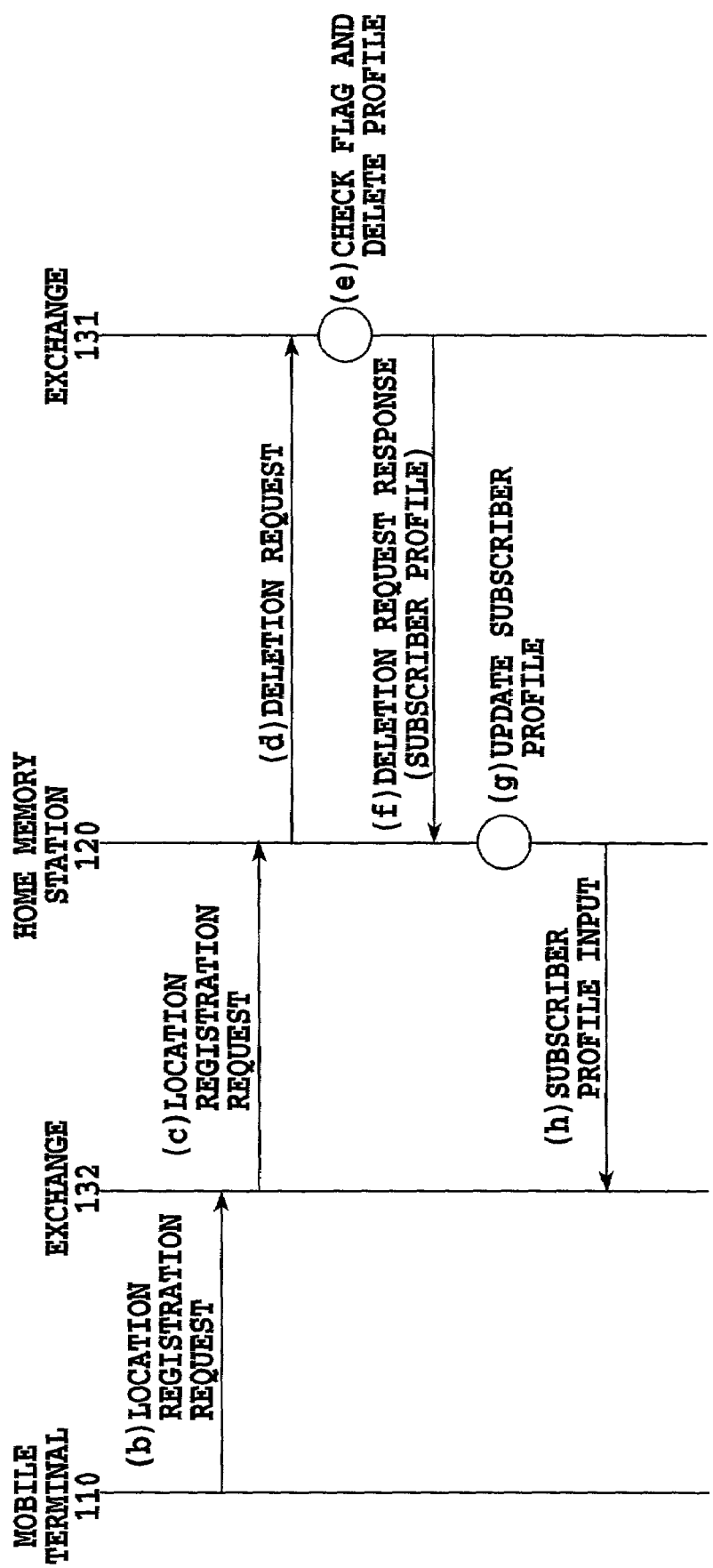
FIG. 8 is a diagram showing an example of a process executed according to the embodiment of the present invention if the mobile terminal has moved to the service area of a different exchange.

FIGS. 7 and 8 are diagrams showing an example of a process executed according to the embodiment of the present invention if the mobile terminal has moved to the service area of a different exchange. When the mobile terminal 110 moves from the service area of the exchange 131 to the service area of an exchange 132 (FIG. 7(a)) and the mobile terminal 110 transmits a location registration request to the exchange 132 (FIGS. 7 and 8(b)), the exchange 132 transmits the location registration request to the home memory station ((c)). Upon receiving the location registration request, the home memory station 120 requests the exchange 131, which is the old exchange whose service area had the mobile terminal 110, to delete the subscriber profile of the mobile terminal 110((d)). Before deleting the subscriber profile, the mobile terminal 131 checks the flag to see whether or not the subscriber profile was changed while the mobile terminal 110 was present in the service area of the exchange 131((e)). If the subscriber profile has been changed, the exchange 131 sets the changed subscriber profile in a deletion request response signal and transmits the signal to the home memory station 120((f)). The home memory station 120 updates a subscriber profile retained thereby to the received one and then retains the latter ((g)). If the subscriber profile has not been changed, the exchange 131 simply transmits a deletion request response signal to the home memory station 120. Subsequently, the home memory station 120 inputs the subscriber profile to the exchange 132, which is the new exchange whose service area has the mobile terminal 110((h)). The exchange 132 retains this subscriber profile.

Figure 9:
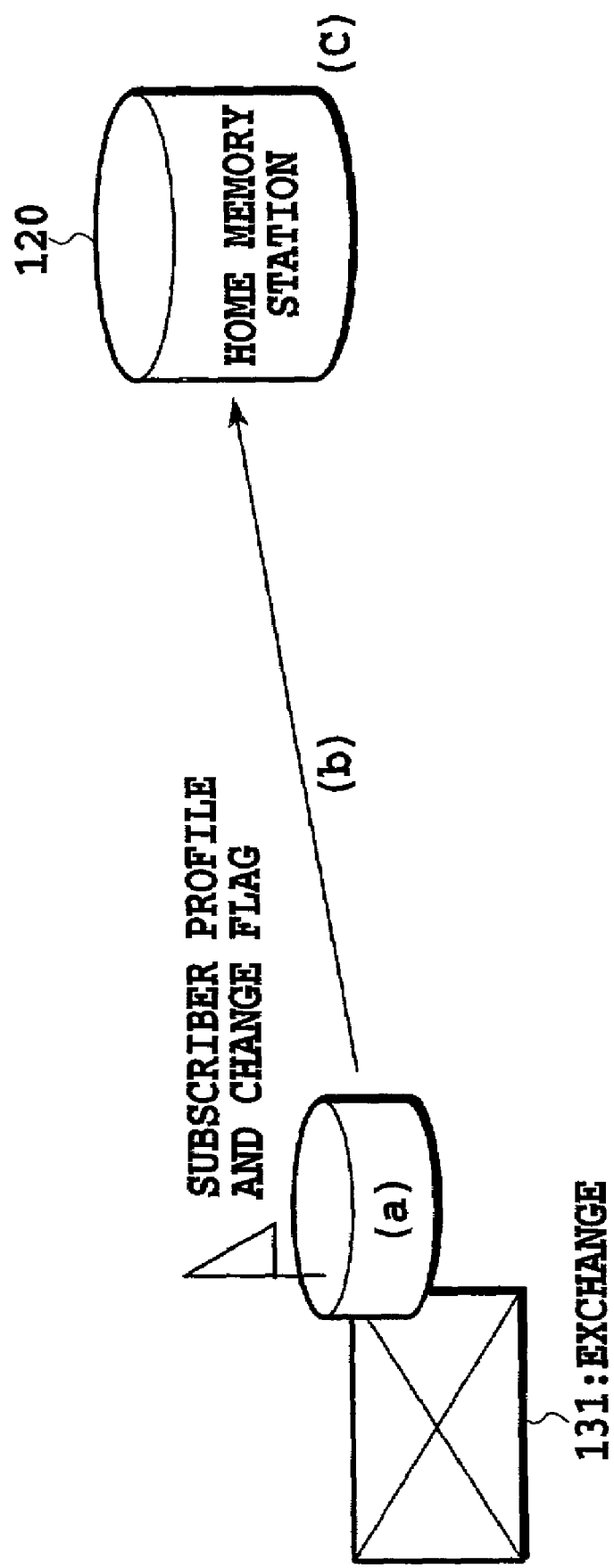
Figure 10:
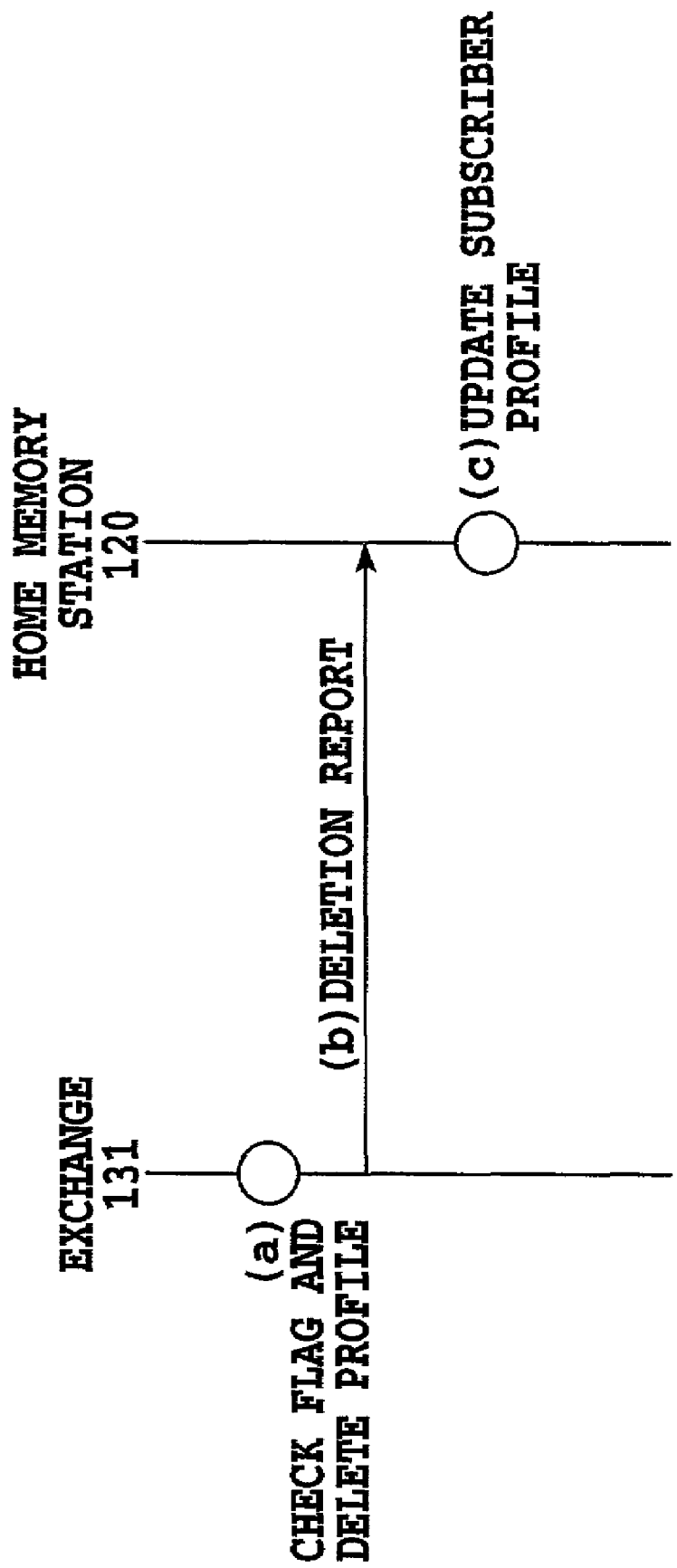

FIGS. 9 and 10 are diagrams showing an example of a process executed to delete the subscriber profile from the exchange in response to activation by a maintainer or the like. Before deleting the subscriber profile, the mobile terminal 131 checks the flag to see whether or not the subscriber profile was changed while the mobile terminal corresponding to the subscriber profile was present in the service area of the exchange 131 (FIGS. 9 and 10(a)). If the subscriber profile has been changed, the exchange 131 sets the changed subscriber profile in a deletion report signal and transmits the signal to the home memory station 120((b)). The home memory station 120 updates a subscriber profile retained thereby to the received one and then retains the updated subscriber profile ((c)).

In the above description, the present invention is applied to all the subscriber profiles. However, it may be applied to some of the subscriber profiles, whereas the prior art may be applied to the others. This enables services to be discriminated from each other or prioritized. For example, the prior art may be applied to data that must not be lost (for example, ForwardedToNumber) to always update it. The present invention may be applied to data that may be lost (for example, application timer) to update it only when the need arises. The information on the application timer can be provided as a default, so that even if it is lost, no serious problem generally occurs.

As described above, the present invention can reduce the number of signals transmitted and received between the home memory station and the exchange when the subscriber profile is to be changed.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A method for updating a subscriber profile of a mobile terminal present in a service area of an exchange, the method comprising, at the exchange:
    changing the subscriber profile of the mobile terminal at a request from the mobile terminal;
    setting a flag indicating that the subscriber profile of the mobile terminal has been changed;
    receiving a request from a home memory station for the subscriber profile of the mobile terminal when the mobile terminal moves from the service area of said exchange to service area of another exchange; and
    transmitting the changed subscriber profile of the mobile terminal to the home memory station if the flag is set.

2. The method as claimed in claim 1, further comprising:
    deleting the changed subscriber profile of the mobile terminal after transmitting it to the home memory station.

3. The method as claimed in claim 1, further comprising, at the home memory station:
    transmitting the latest subscriber profile of the mobile station to an other exchange at a request from the other exchange.

4. An exchange comprising:
    means for changing a subscriber profile of a mobile terminal present in a service area of the exchange, at a request from the mobile terminal and retaining the changed subscriber profile;
    means for setting a flag indicating that the subscriber profile of the mobile terminal has been changed;
    means for receiving a request from a home memory station for the subscriber profile of the mobile terminal when the mobile terminal moves from the service area of said exchange to service area of another exchange; and
    means for transmitting the changed subscriber profile of the mobile terminal to the home memory station if the flag is set.

5. The exchange as claimed in claim 4, further comprising:
    means for deleting the changed subscriber profile of the mobile terminal after transmitting it to the home memory station.

6. A mobile communication system comprising at least a first exchange, a second exchange and a home memory station,
    the first exchange comprising:
        means for retaining a subscriber profile of a mobile terminal present in a service area of the first exchange;
        means for changing the subscriber profile of the mobile terminal at a request from the mobile terminal and setting a flag indicating that the subscriber profile of the mobile terminal has been changed;
        means for receiving a request from the home memory station for the subscriber profile of the mobile terminal when the mobile terminal moves from the service area of said exchange to service area of another exchange; and
        means for transmitting the changed subscriber profile of the mobile terminal to the home station if the flag is set;
    the home memory station comprising:
        means for transmitting the latest subscriber profile of the mobile terminal to the second exchange at a request from the second exchange.

7. A mobile communication system as claimed in claim 6, the first exchange further comprising:
    means for deleting the changed subscriber profile of the mobile terminal after transmitting it to the home memory station.

* * * * *

UNITED STATES PATENT AND TRADEMARK OFFICE
CERTIFICATE OF CORRECTION

PATENT NO. : 7,123,909 B2 Page 1 of 1
APPLICATION NO. : 10/054735
DATED : October 17, 2006
INVENTOR(S) : Nakamura et al.

It is certified that error appears in the above-identified patent and that said Letters Patent is hereby corrected as shown below:

Column 1
Line 17, change "Exchange" to --exchange--
Line 37, change "change" to --changes--
Line 55, change "30" to --31--

Signed and Sealed this

Third Day of July, 2007

JON W. DUDAS
*Director of the United States Patent and Trademark Office*